United States Patent
Srivastava et al.

[11] Patent Number: 5,900,968
[45] Date of Patent: May 4, 1999

[54] METHOD OF FAST GAIN CONTROL IN WDM OPTICAL NETWORKS

[75] Inventors: Atul Kumar Srivastava, Eatontown; James W. Sulhoff, Ocean; Yan Sun, Middletown; Robert William Tkach, Little Silver; John Lehrer Zyskind, Shrewsbury, all of N.J.

[73] Assignee: Lucent Technologies Inc., Murray Hill, N.J.

[21] Appl. No.: 08/728,629

[22] Filed: Oct. 10, 1996

Related U.S. Application Data

[63] Continuation-in-part of application No. 08/613,750, Feb. 23, 1996, abandoned.

[51] Int. Cl.⁶ .................................................. H01S 3/00
[52] U.S. Cl. ............................................ 359/341; 359/134
[58] Field of Search ................................ 359/110, 134, 359/176, 177, 341

[56] References Cited

U.S. PATENT DOCUMENTS

| | | | |
|---|---|---|---|
| 5,025,142 | 6/1991 | Aoshima et al. | 250/201.9 |
| 5,311,347 | 5/1994 | Kubo et al. | 359/176 |
| 5,396,360 | 3/1995 | Majima | 359/133 |
| 5,502,810 | 3/1996 | Watanabe | 359/177 |
| 5,524,144 | 6/1996 | Suzuki | 359/176 |
| 5,537,244 | 7/1996 | Fukushima et al. | 359/341 |

*Primary Examiner*—Mark Hellner
*Attorney, Agent, or Firm*—Jeffery J. Brosemer

[57] ABSTRACT

In a WDM network employing a plurality of optical amplifiers in at least one optical fiber link, a system and method for dynamically controlling gain in accordance with the collective behavior of the amplifier chain. According to the present invention, the required response time of dynamic gain control is selected substantially inversely relative to the number of amplifiers in the communication path. Illustratively, in a large-scale optical network (with signal channel paths traversing say, a hundred optical amplifiers), the response time of gain control in accordance with the present invention may be on the order of 5 $\mu s$ or even less.

6 Claims, 9 Drawing Sheets

METHOD OF FAST GAIN CONTROL IN WDM OPTICAL NETWORKS

This application is a continuation in part of application Ser. No. 08/013,750 filed on Feb. 23, 1996 now abandoned.

FIELD OF THE INVENTION

The present invention relates generally to optical fiber communication networks and, more particularly, to systems and methods for dynamically controlling gain in accordance with the collective behavior of the amplifier chains employed in the links of such networks.

BACKGROUND OF THE INVENTION

A dramatic increase in the information capacity of an optical fiber can be achieved by the simultaneous transmission of optical signals over the same fiber from many different light sources having properly spaced peak emission wavelengths. By operating each source at a different peak wavelength, the integrity of the independent messages from each source is maintained for subsequent conversion to electric signals at the receiving end. This is the basis of wavelength division multiplexing (WDM).

Wavelength switched optical networks potentially offer high capacity networking at lower cost than current electronically switched networks. The rare-element doped fiber amplifiers such, for example, as erbium doped fiber amplifiers (EDFA's) in the nodes and repeaters of such networks will each be traversed by multiple signal channels following diverse routes. In optical amplifiers such as EDFA's, amplified spontaneous emission (ASE) is the major source of noise. ASE originates from the spontaneous emission of incoherent light over the full gain bandwidth of the amplifier. This is the random noise contribution of the amplifier. In the wavelength domain, gain saturation induced by a data channel operating at $\lambda_1$ produces a level change in another data channel at wavelength $\lambda_2$. If the optical powers in the transmission fibers are too high, optical nonlinearities, such as Stimulated Brillouin Scattering, can occur and degrade the signals.

In optically amplified systems, the above described noise sources present two limitations on the amplifier operating range. At low input signal levels the amplifier random noise contribution, ASE, causes bit errors (signal-spontaneous beat noise) while at large input signal levels, nonlinearities in the transmission medium can also add noise which degrades performance.

Although automatic gain control circuit (AGC) employing laser feedback at the detection end can compensate for fluctuations in the data stream that occur on the order of 1 ms, significant crosstalk between channels can occur for multichannel applications such as wavelength division multiplexing (WDM), especially when channel(s) is/are dropped or added to the system. The number of channels traversing an EDFA may, in fact, change suddenly as a result of a network reconfiguration or a fault that interrupts some of the channels. To prevent performance penalties in a high capacity network, the power excursions experienced by the surviving channels—those which share an amplifier with the channels directly affected by the fault or reconfiguration—should be limited when channels are added and when channels are dropped.

The gain medium in an EDFA has a comparatively long excited state lifetime or relaxation time, and for this reason is generally regarded as allowing for a larger saturation energy and hence, as exhibiting virtually no modulation of the saturation level at high speed data pulses (pulse period<1 ns). In fact, it has been reported that transient effects of gain saturation and recovery in an individual amplifier typically occur on a 100 µs–1 ms time scale. Desurvire et al, *Erbium Doped Fiber Amplifiers*, 1994, p. 412. The inventors herein have, however, observed gain dynamics in a chain of EDFA's almost two orders of magnitude faster than this and, for large scale wavelength routed networks, gain dynamics three orders of magnitude faster may be predicted. These fast transients in chains of amplifiers may ultimately constrain the design or extent of multi-wavelength optical networks. Accordingly, a need is recognized for dynamic gain control fast enough to ensure reliable service in high capacity networks employing significant numbers of optical amplifiers in the communication paths thereof.

SUMMARY OF THE INVENTION

In accordance with the present invention, the aforementioned deficiencies are overcome and an advance is made in the art by providing, in an optical network employing a plurality of optical amplifiers along a communication path, a system and method for dynamically controlling gain in accordance with the collective behavior of the amplifier chain.

Essentially, the present invention is based upon the recognition that the required response time of dynamic gain control bears a substantially inverse relation to the number of amplifiers in the communication path. Illustratively, in a large-scale optical network (with signal channel paths traversing say, a hundred optical amplifiers), the required response time of gain control in accordance with the present invention may be on the order of 100 ns.

BRIEF DESCRIPTION OF THE DRAWINGS

The above features and advantages of the present invention will become apparent from the ensuing description of several preferred exemplary embodiments, which should be read in conjunction with the accompanying drawings, in which.

DETAILED DESCRIPTION OF THE INVENTION

Figure 1:
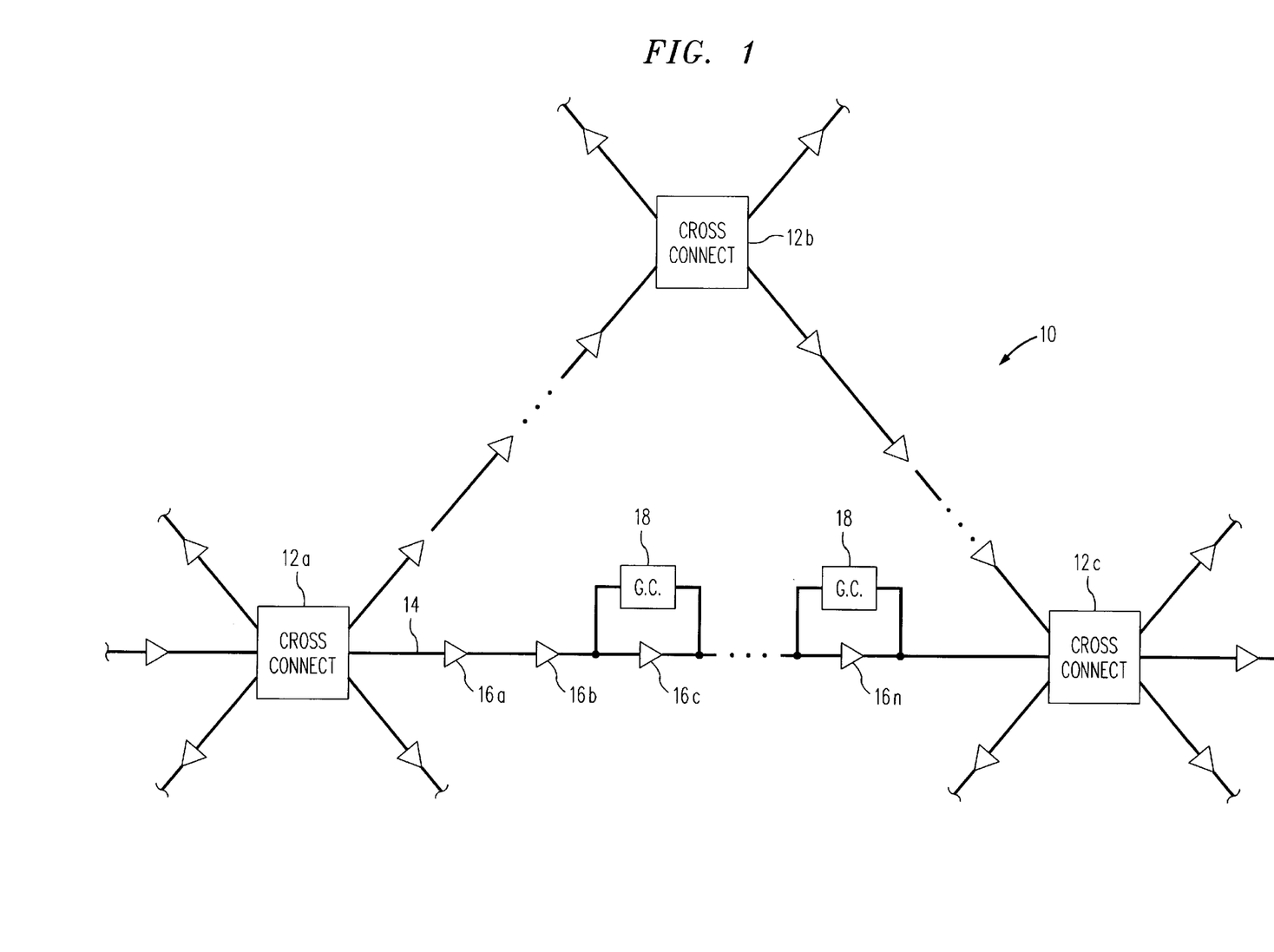
FIG. 1 depicts an illustrative optical network employing chains of optical amplifiers and fast-response dynamic gain control in accordance with the present invention.

A portion of an illustrative large-scale WDM optical network 10 is shown schematically in FIG. 1. As seen in FIG. 1, wavelength division multiplexed data is transmitted via multiple wavelengths or channels, between a plurality of cross-connect switches or nodes distributed throughout the network, via optical fiber links. Illustratively, network 10 may include many such nodes. For purposes of clarity and ease of illustration, however, only three such switches— indicated generally at 12a, 12b, and 12c are shown. As can be seen in FIG. 1, the optical fiber links between a pair of nodes, as for example, link 14 that interconnects cross-connect switches 12a and 12c, typically may include a number of EDFA optical amplifiers—these being indicated generally at 16a through 16n; these EDFA's can have a typical spacing of say 40 km.

Essentially, the present invention is based on the recognition by the inventors herein that the gain dynamics in a chain of EDFA's such as those deployed in link 14 of network 10 may be up to several orders of magnitude faster than those reported for a single amplifier. To this end, at least some of the amplifiers in an optical link of network 10 are provided with a dynamic gain control arrangement 18 that is fast enough to ensure continued reliable service, in the surviving channels being transmitted along the link, when one or more channels are suddenly dropped or added, as may be experienced when a system reconfiguration or fault interrupts some of the channels.

Figure 2:
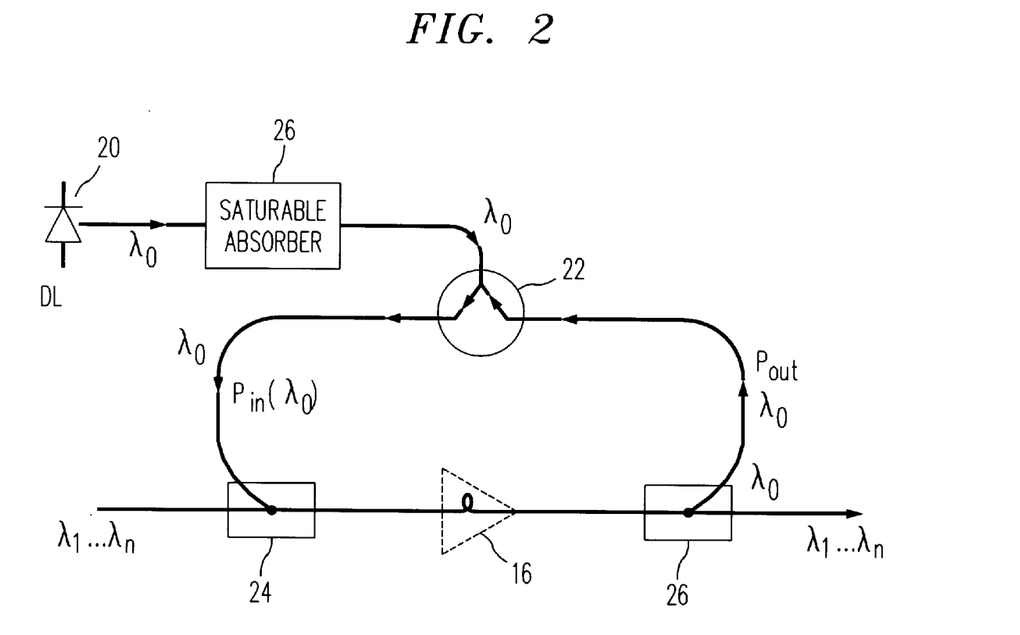
FIG. 2 is a schematic block diagram of a dynamic gain control arrangement constructed in accordance with an illustrative embodiment of the present invention.

There is shown in FIG. 2 a gain control arrangement configured to implement fast-response gain control in accordance with an illustrative embodiment of the present invention. In the illustrative arrangement shown in FIG. 2, optical amplifier 16 should be understood to be one of a chain of EDFA amplifiers that may be found along a communication link, as discussed in connection with FIG. 1 above. Wavelengths $\lambda_1$–$\lambda_n$, representing multiple channels of a wavelength switched network, are received at the input of amplifier 16 in a conventional manner and amplified for delivery to the next amplifier or destination node.

As can be seen in FIG. 2, a probe and control signal $\lambda_0$ is also launched into the amplifier 16. Launching of the probe signal and control is accomplished, in the illustrative embodiment, by a diode laser source 20, a three port optical circulator 22, and a pair of optical couplers 24 and 26. A saturable absorber 26 is coupled between laser source 20 and circulator 22. It is believed that operating principles of saturable absorbers are well understood by those skilled in the art and a detailed description thereof is deemed to be unnecessary to gaining an understanding of the present invention. It suffices to say that in an atomic medium, either the attenuation coefficient or the gain coefficient $\alpha_m$ in an atomic medium will saturate with increasing signal intensity I in the general fashion given by:

$$\alpha_m = \alpha_m(I) = \alpha_{m0} \times \frac{1}{1 + \frac{I}{I_{sat}}} = \alpha_{m0} \times \frac{1}{1 + \mathrm{const} \times \mathrm{signal\,power}}$$

where $\alpha_{m0}$ is the small signal (unsaturated) attenuator or gain coefficient; I is the applied signal intensity (usually expressed as power per unit area); and $I_{sat}$ is a saturation intensity at which the gain or loss coefficient is saturated down to half its initial value $a_{m0}$. It will be readily appreciated by those skilled in the art that when a channel is dropped, gain increases and the output power of probe and control channel $\lambda_0$ also increases. As a result, the power delivered to saturable absorber increases so that the loss introduced to the signal incident thereon from source 20 decreases. Accordingly, the input power $P_{in}(\lambda_0)$ delivered to the input of amplifier 16 via coupler 24 is increased and the gain thereof, consequently, is reduced.

Figure 3:
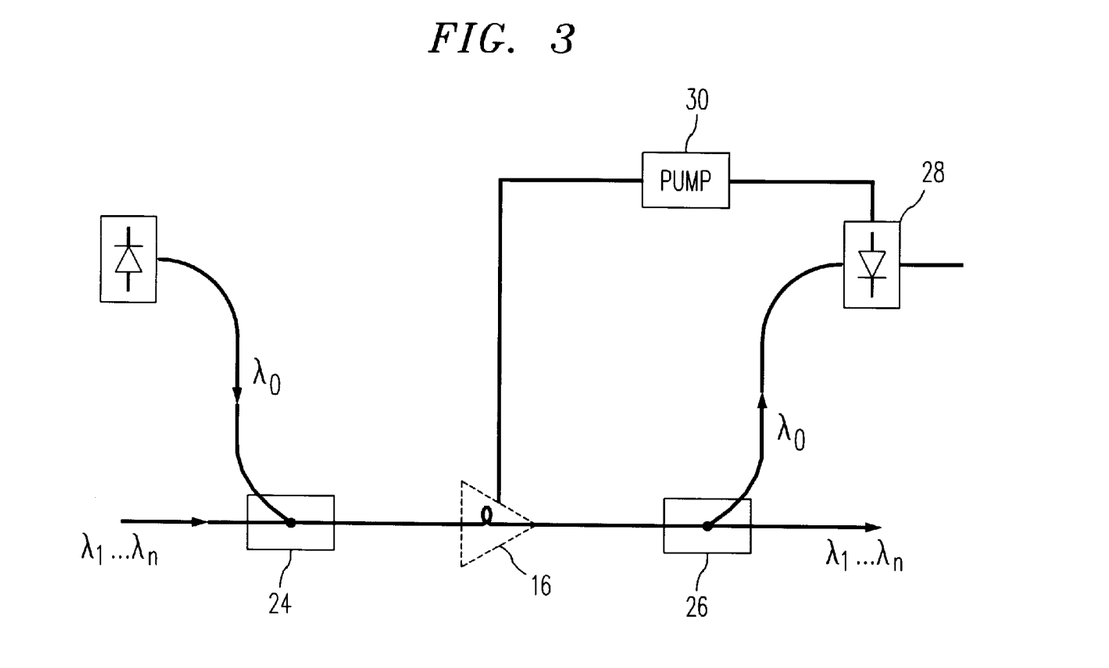
FIG. 3 is a schematic block diagram of a dynamic gain control arrangement constructed in accordance with a further embodiment of the present invention.

With reference to FIG. 3, there is shown an alternate gain control configuration capable of providing the gain control response time required by the present invention. As seen in FIG. 3, in which like numerals refer to like elements, a photodiode 28 coupled to the output of amplifier 16 is utilized to control a pump light source 30. As will be readily appreciated by those skilled in the art, a pump light source as source 30 is typically used to pump light into the optical fiber to excite the rare-earth dopant so as to amplify the optical signal incident on the fiber. Based upon a comparison of the input power and output power of the probe signal $\lambda_0$, the amount of light pumped into EDFA 16 is adjusted in such a manner as to limit the gain excursions in each surviving channel to 0.5 dB when at least one channel is added and to 2.0 dB when at least one channel is dropped.

Figure 4:
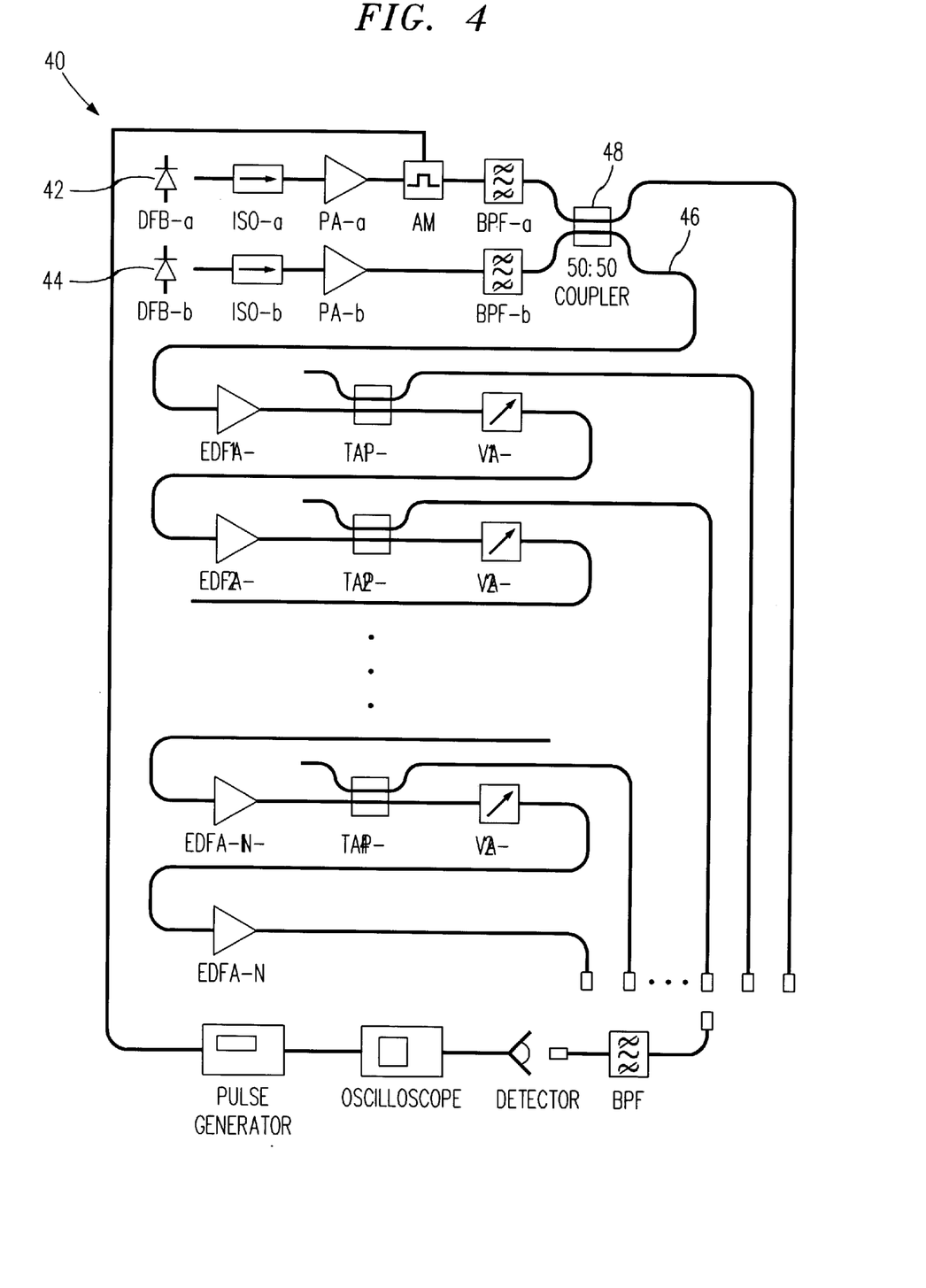
FIG. 4 is an apparatus constructed to simulate a communication link in a large scale network employing a plurality of optical amplifiers, from which the power transients experienced by surviving channels when one or more channels are added or dropped was measured.

FIG. 4 is an apparatus 40 constructed to simulate a communication link in a large scale network employing a plurality of optical amplifiers, from which the power transients experienced by surviving channels when one or more channels are added or dropped was measured. As seen in FIG. 4, apparatus 40 includes two distributed feedback laser sources 42 and 44, each providing power equivalent to that of four channels launched onto fiber path 46 via a 50—50 coupler 48. To simulate 40 km spacing between each optical amplifier (EDFA), a variable attenuator (VA-1 through VA-N-1) was employed along fiber path 46. Channels were added or dropped and measurements were taken after each amplifier in order to observe the behavior of the surviving channels. The total input IS signal power to each amplifier was 6 dB, corresponding in a large scale network in a large scale network.

Figure 5:
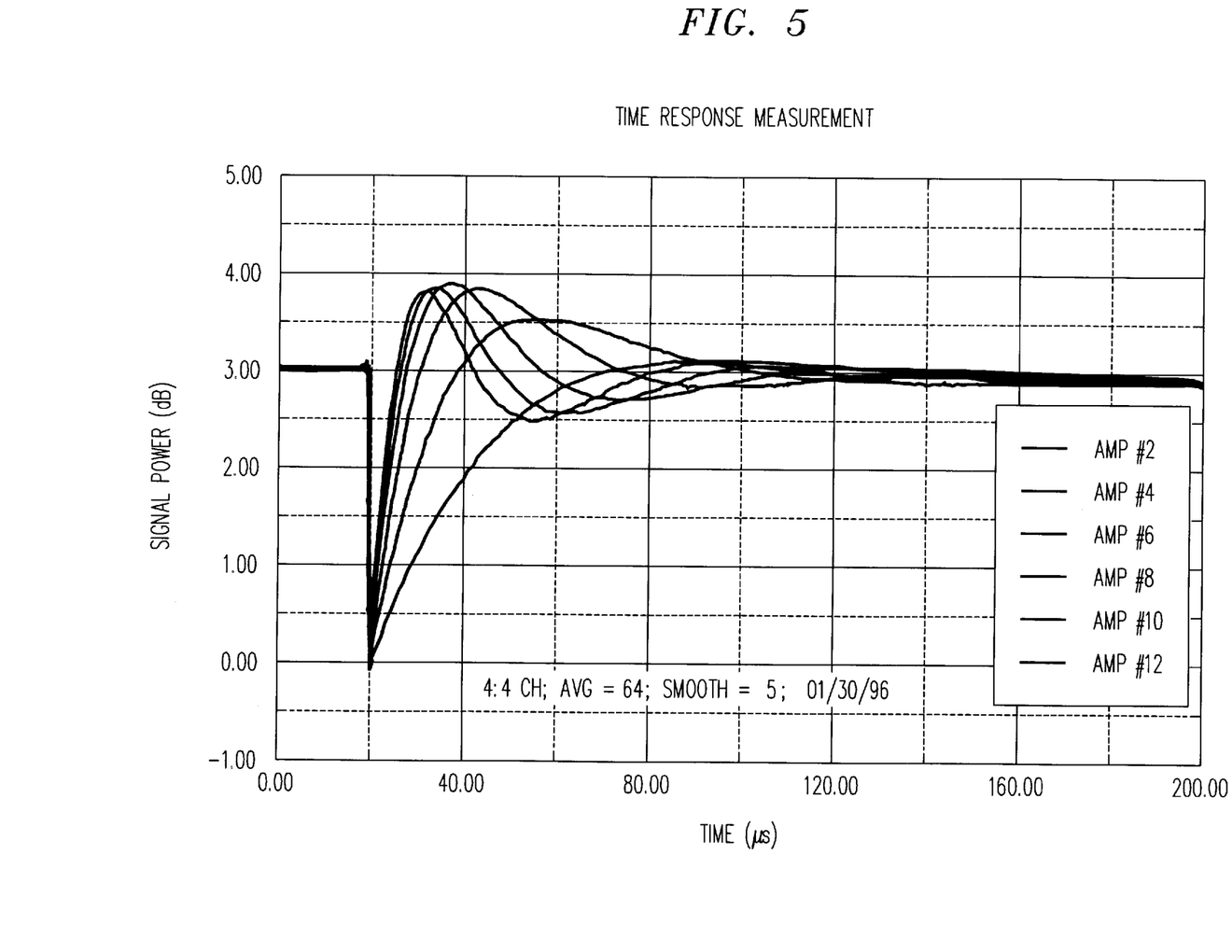
FIG. 5 is a graphical representation of time response measurement for the experimental apparatus of FIG. 4, depicting the output power of the $2^{nd}$, $4^{th}$, $6^{th}$, $8^{th}$, and $10^{th}$ amplifiers in a chain when four of eight channels were dropped.

FIG. 5 is a graphical representation of time response measurement for the experimental apparatus of FIG. 4, depicting the output power of each amplifier 2, 4, 6, 8, 10, and 12 in a chain with 12 amplifiers when four of eight channels were dropped. The EDFA's were mid-amplifier pumped two stage EDFA's with 10 dB gain and dual 980 nm pumps. When one laser is blocked at time t=0, corresponding to a sudden loss of four of the eight channels, the output power of each EDFA immediately dropped by 3 dB and the power in each of the surviving channels then increased toward double the original channel power to conserve the amplifier output power.

Figure 6:
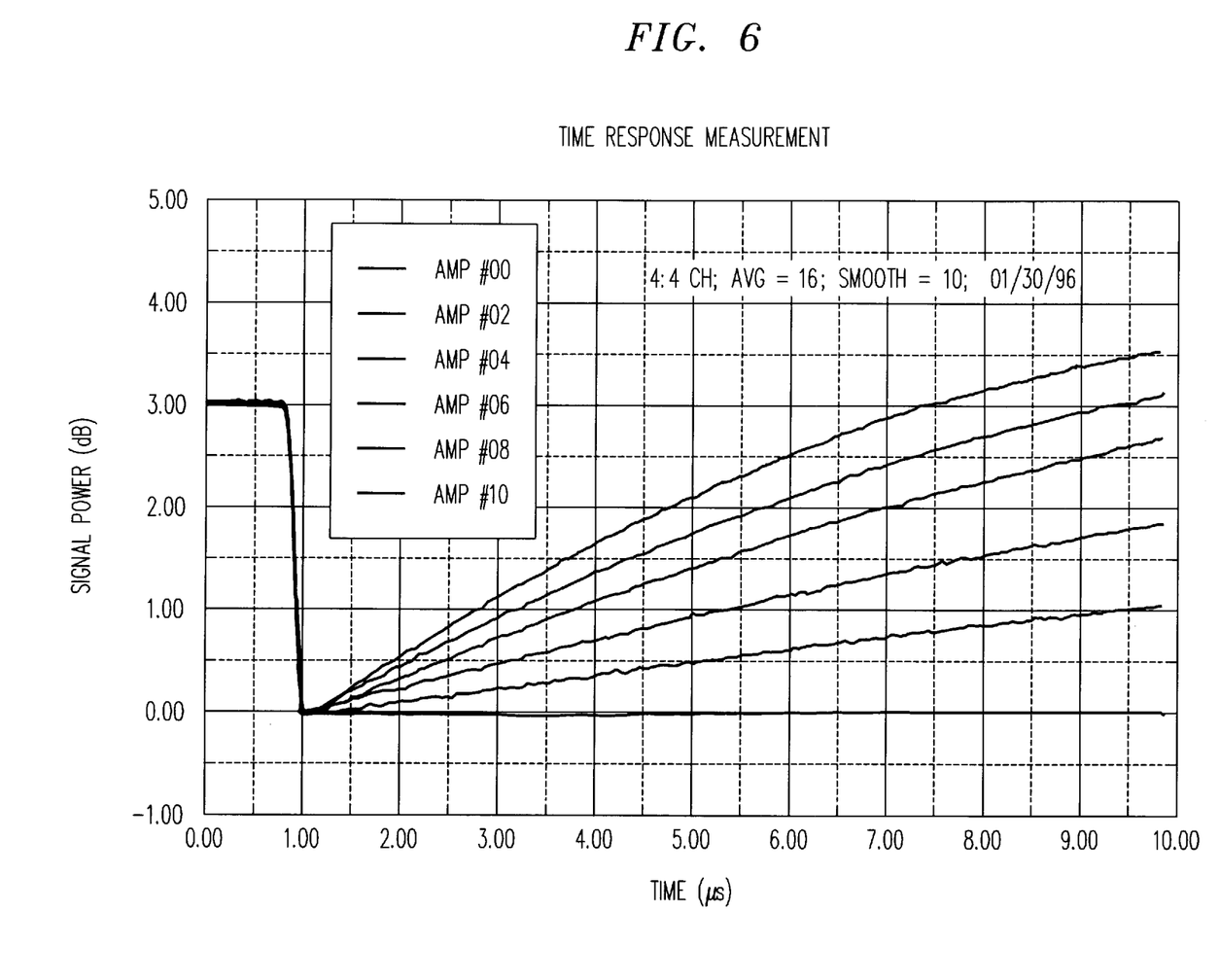
FIG. 6 is a graphical representation of time response measurement for the experimental apparatus of FIG. 4, depicting the output power on an expanded time scale of the $2^{nd}$, $4^{th}$, $6^{th}$, $8^{th}$, and $10^{th}$ amplifiers in a chain when four of eight channels are dropped.
Figure 7:
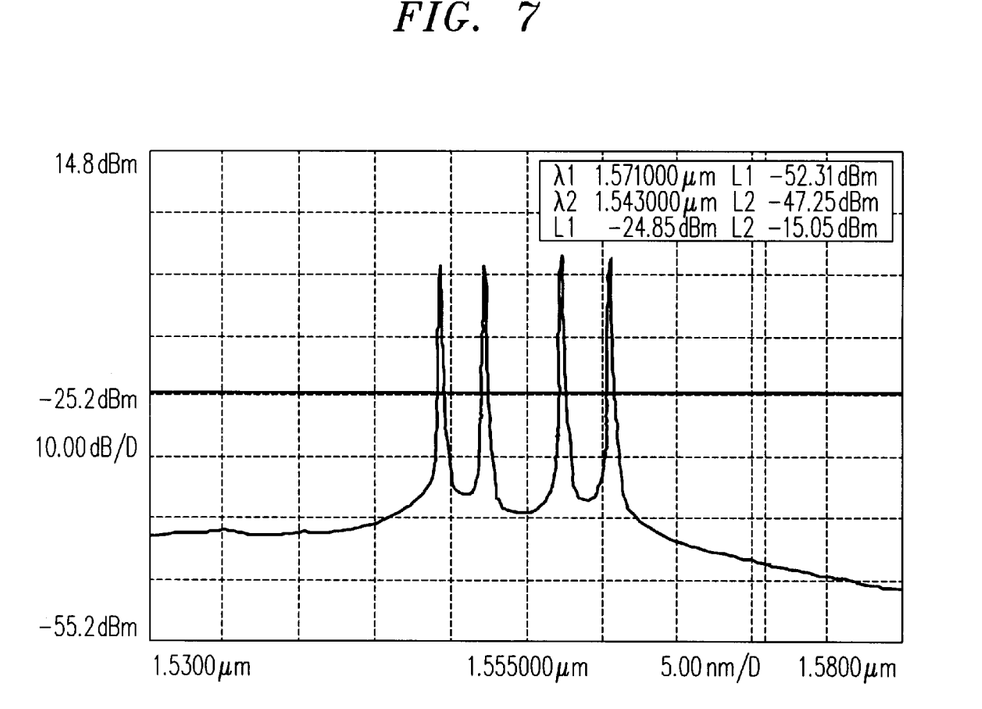
FIG. 7 depicts the spectrum, for the experimental apparatus similar to that of FIG. 4, after five optical amplifiers, where the input power is supplied equally by four lasers, each at the wavelength of a different channel.
Figure 8:
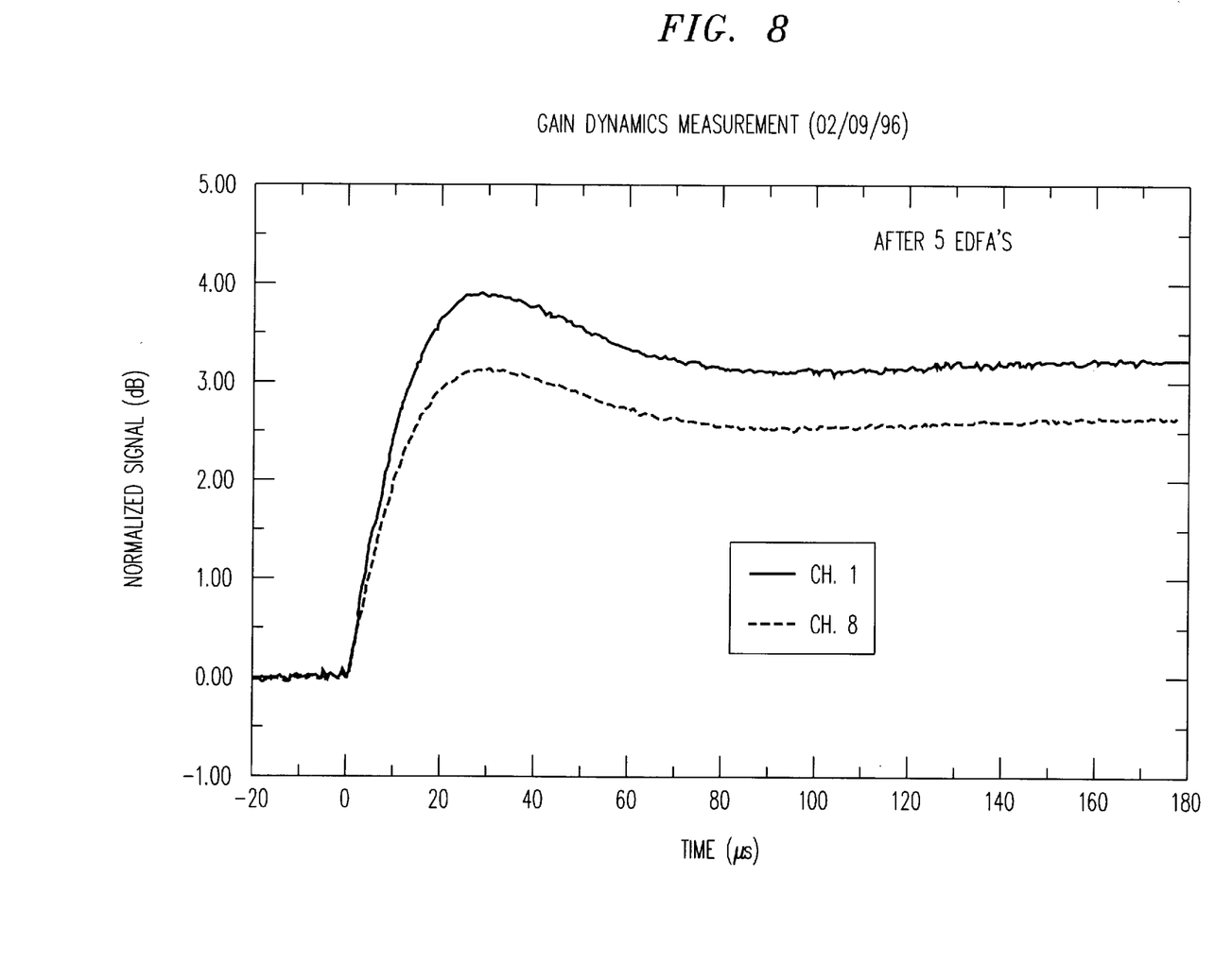
FIG. 8 is a graphical representation of time response measurement for the experimental apparatus similar to that of FIG. 4 where the signal power is provided by 4 lasers, depicting, upon the interruption of two of the four channels measured in FIG. 7, the signal power response in the surviving two channels.

FIG. 6 is a graphical representation of time response measurement for the experimental apparatus of FIG. 4, depicting the output power of amplifiers 2, 4, 6, 8, and 10 in a chain for short time after four of eight channels are dropped. As seen in FIG. 5 and 6, for longer chains of amplifiers, the increase in power is faster—with a peak overshooting twice the initial channel. These power transients are fast, two orders of magnitude faster than previous results for individual amplifiers. FIG. 7 depicts the spectrum, for an experimental apparatus similar to that of FIG. 4, after five optical amplifiers, where the input power is divided equally among four channels at 1549.3, 1552.5, 1557.4, and 1560.6 nm (wavelengths 1,3,6 and 8, respectively). After channels 3 and 6 were interrupted, surviving channels 1 and 8 suffered unacceptable power increases in short times, as seen in FIG. 8.

Figure 9:
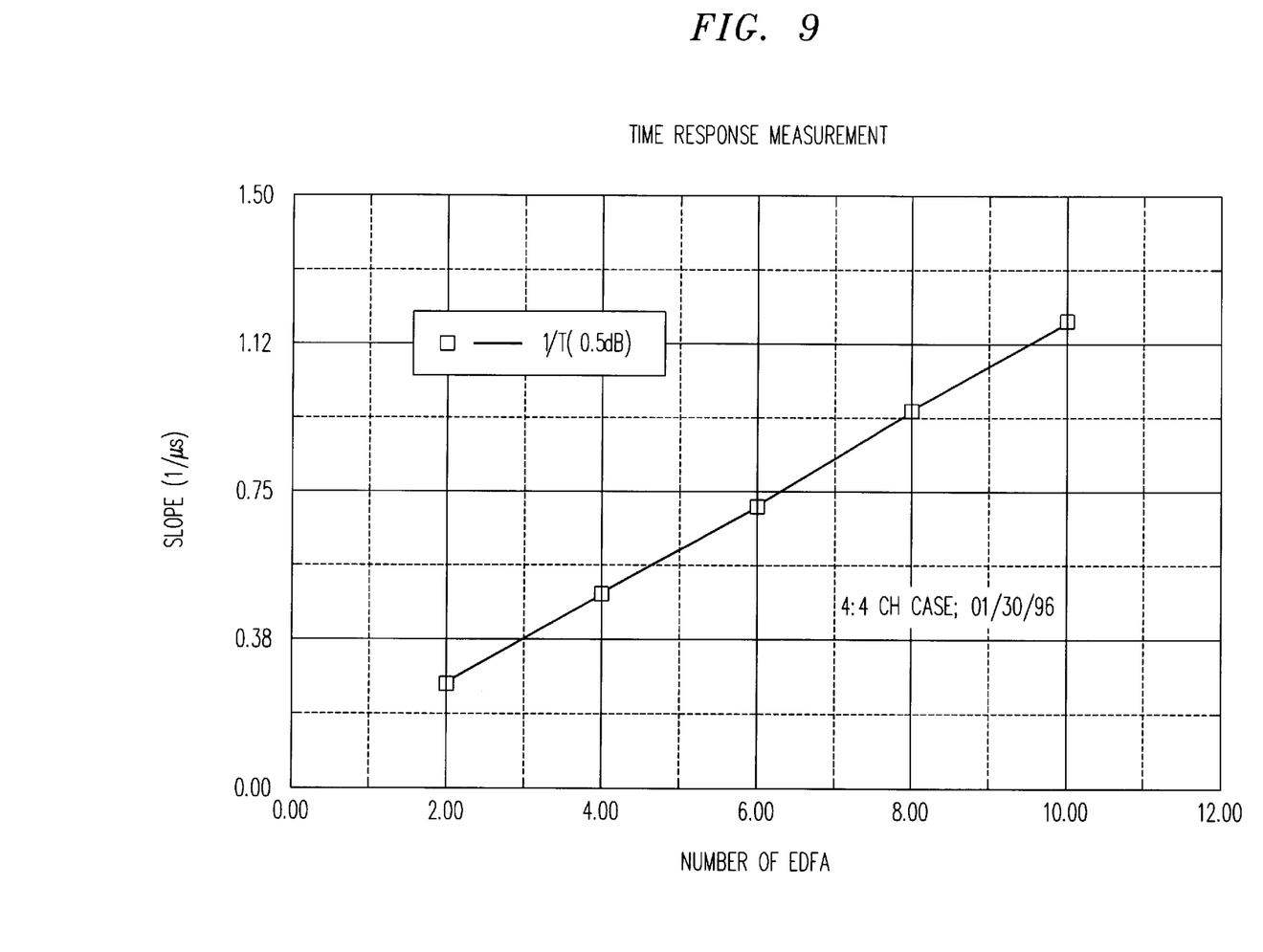
FIGS. 9 and 10 demonstrate the inverse relationship, observed using the experimental apparatus of FIG. 4, between the number of amplifiers in a chain to the response times required to limit power excursions after dropping and adding channels, respectively.
Figure 10:
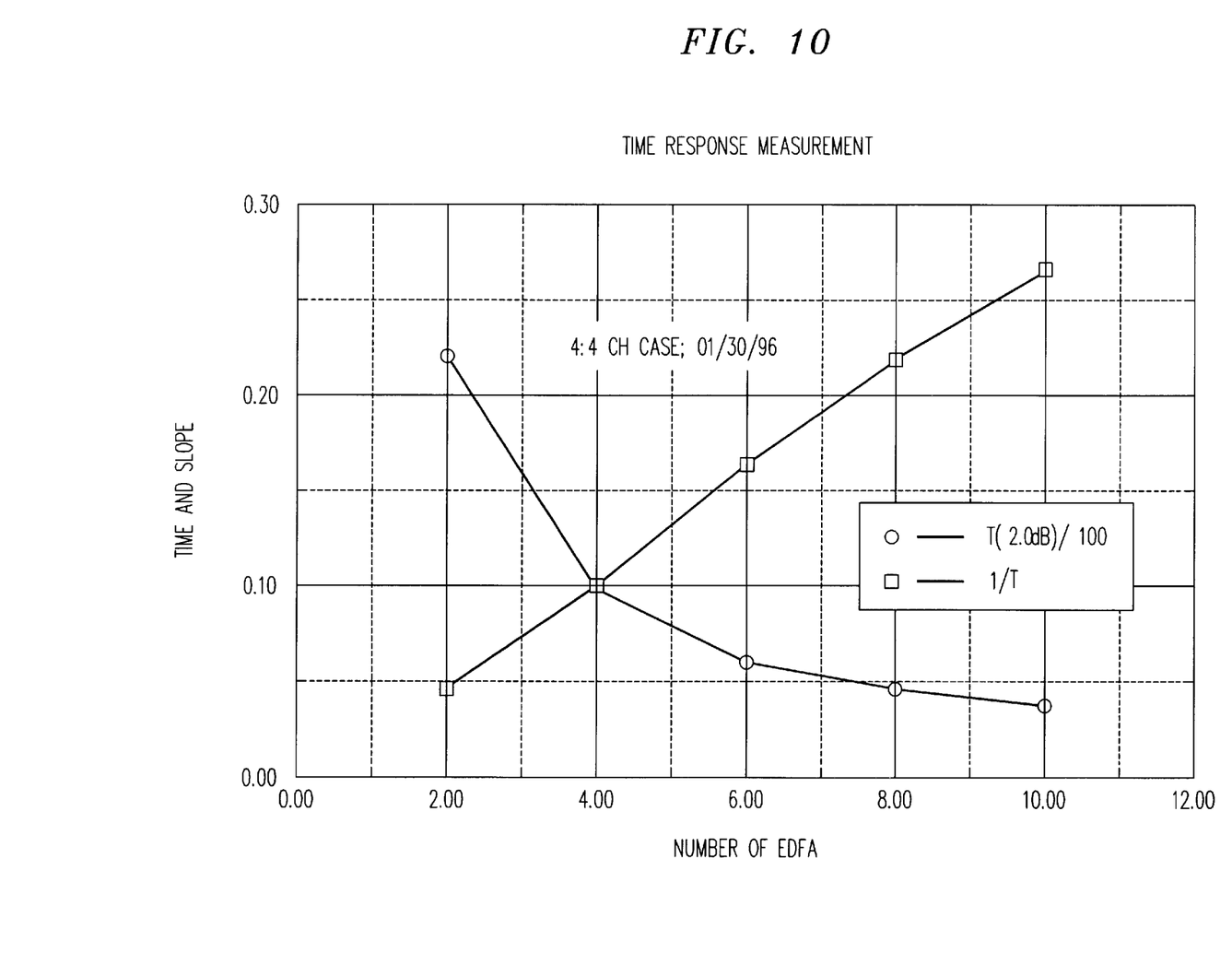

To prevent performance penalties in a large scale multi-wavelength optical network, surviving channel power excursions must be limited to, say, for example, 0.5 dB when channels are added and 2 dB when channels are dropped. The response times required to limit the power excursions to 0.5 dB (850 ns after 10 amplifiers) and 2 dB (3.75 $\mu$s after 10 amplifiers) are inversely proportional to the number of amplifiers in the chain (FIGS. 9 and 10). To protect surviving channels in networks with paths traversing one hundred amplifiers, response times as short as 375 ns will be required when four channels are dropped and 200 ns when seven channels are dropped. Accordingly, dynamic gain control performed within a response time scaled to the size of the network, is required in order to maintain error free performance in surviving channels.

From the foregoing, it should be readily ascertained that the invention is not limited by the embodiments described above which are presented as examples only but may be modified in various ways within the intended scope of protection as defined by the appended patent claims.

What is claimed is:

1. In an optical communications network including a signal path comprising a plurality of wavelength-division-multiplexed channels and traversing a plurality of n optical amplifiers, the optical amplifiers each including a mechanism for adjusting amplifier gain and/or amplifier output power in response to an addition and/or a loss of one or more wavelength-division-multiplexed communications channels, a method of determining a time duration within which said amplifier output power and/or optical amplifier gain is adjusted for each amplifier, the method CHARACTERIZED IN THAT, for each of the plurality of optical amplifiers, the time duration within which the optical amplifier gain and/or optical amplifier output power is adjusted is less than or equal to t/n, where t is related to a period of time during which the optical amplifier gain changes from a first specified gain value to a second specified gain value, wherein said optical amplifier gain and/or optical amplifier output power adjusting step is performed within 50 $\mu$s of the addition and/or the loss of the one or more wavelength-division-multiplexed channels.

2. The method of claim 1, wherein the optical amplifier is an erbium-doped fiber amplifier.

3. A high capacity optical communication network comprising at least one optical communication path in which a plurality of wavelength division multiplexed signal channels are transmitted between at least one upstream end and at least one downstream end thereof, comprising:

a plurality of rare earth doped optical fiber amplifiers, each amplifier having an amplifier gain and an amplifier output power associated therewith;

a respective gain control arrangement, associated with at least some corresponding ones of said rare earth doped optical fiber amplifiers, for limiting power excursions in each surviving channel to no more than 3 dB when at least one channel is added and to no more than 6 dB when at least one channel is dropped;

the gain control arrangement determining the time duration within which the amplifier gain and/or the amplifier output power is adjusted to be less than or equal to t/n, where t is related to a period of time during which the optical amplifier gain changes from a first specified gain value to a second specified gain value, and wherein said amplifier gain and/or amplifier output power adjusting step is performed within 50 $\mu$s of the at least one channel being added and/or the at least one channel being dropped.

4. The network of claim 3, wherein said at least one optical communication path includes at least two optical amplifiers, and wherein said gain control arrangement is operable to perform gain control upon loss of four channels within less than 50 $\mu$s.

5. The network of claim 3, wherein said at least one optical communication path includes one hundred optical amplifiers, and wherein said gain control arrangement is operable to perform gain control upon loss of four channels within less than 5 $\mu$s.

6. A high capacity optical communication network comprising at least one optical communication path in which a plurality of wavelength division multiplexed signal channels are transmitted between at least one upstream end and at least one downstream end thereof comprising:

a plurality of rare earth doped optical fiber amplifiers, a respective gain control arrangement, associated with at least some corresponding ones of said rare earth doped optical fiber amplifiers, for limiting power excursions in each surviving channel to no more than 3 dB when at least one channel is added and to no more than 6 dB when at least one channel is dropped, wherein said gain control arrangement includes a diode laser for generating a probe wavelength signal, a saturable absorber coupled to an output of said diode laser, and a three-port circulator having a first port coupled to the output of a corresponding one of said optical amplifiers, a second port coupled to an input of said corresponding optical amplifier, and a third port coupled to the saturable absorber, whereby an increase in amplifier gain as a result of a channel reconfiguration induces the saturable absorber to allow more of said probe signal to enter said optical amplifier.

* * * * *

UNITED STATES PATENT AND TRADEMARK OFFICE
CERTIFICATE OF CORRECTION

PATENT NO.    : 5,900,968
DATED         : May 4, 1999
INVENTOR(S)   : Atul Kumar Srivastava, James W. Sulhoff, Yan Sun, Robert William Tkach, John Lehrer Zyskind It is certified that error appears in the above-identified patent and that said Letters Patent is hereby corrected as shown below:

Column 1,
Line 2, after the Title insert
-- ACKNOWLEDGEMENT OF GOVERNMENTAL RIGHTS This invention was made with Government support under Agreement No. MDA 972-94-3-0036 awarded by ARPA. The Government has certain rights in the invention. --

Signed and Sealed this

Twenty-seventh Day of November, 2001

Attest:

*Attesting Officer*

NICHOLAS P. GODICI
*Acting Director of the United States Patent and Trademark Office*